United States Patent Office.

CHASE A. STEVENS, OF NEW YORK, N. Y., ASSIGNOR TO ABIJAH RICHARDSON, OF BOSTON, MASSACHUSETTS.

Letters Patent No. 112,649, dated March 14, 1871.

IMPROVEMENT IN TREATING ASBESTUS AND OTHER MINERAL FIBERS FOR USEFUL PURPOSES.

The Schedule referred to in these Letters Patent and making part of the same.

*To all whom it may concern:*

Be it known that I, CHASE A. STEVENS, of the city, county, and State of New York, have invented a new and improved Method of producing a clean flexible fiber or flock, free from grit or other earthy matter, from Hornblende, Asbestus, Amianthus, or other fibrous minerals, for commercial, mechanical, manufacturing, and chemical uses.

My said new invention, discovery, and application consists in taking the crude rock or material from the mine, and eliminating, expelling, and freeing it from all earthy matter, so as to leave a pure, clean, flexible fiber, capable of being spun into yarn, made into pulp for manufacturing paper, made into packing for journals of car-wheels and bearings of shafting, packing for stuffing-boxes of steam and caloric-engines, valves, stems, slip-joints, water and acid-pumps, and for all purposes that cotton, wool, jute, hemp, and other vegetable and animal fibers are used, and for the same and like purposes as they are used; also, for covering steam-boilers, pipes, and cylinders, to prevent the radiation and loss of heat, the same as hair-felt and cement are now used; and in all purposes and uses for preventing the radiation and loss of heat, for preserving of fruit, fresh meats, butter, and lards, the same as ground cork and other substances are now used for the preservation of fresh fruit; for filtering drugs, liquors, and chemicals, as charcoal and other substances are now used; for the manufacture of fire-brick, lining of furnaces, man-holes, and other parts of oil-refineries, and artificial slates for roofing; for covering decks of vessels, steam-boats, lining the same inside, and portions of the outside, to prevent the same from taking fire; for covering and lining railroad-cars, trunks, boxes, express-packages, the ceiling, walls, and roofs of houses or other wooden buildings, lining and covering of oil-tanks, wrapping and covering telegraph-wires either submarine or otherwise, covering and lining refrigerators, packing of safes; for covering or making mail-bags.

I cleanse, purify, and prepare the said mineral fiber, as above described, sometimes by an improved chemical process, as described by my application for Letters Patent now filed in the Patent Office, as well as by the use of suitable machinery, consisting of a powerful compressing crusher, a series of corrugated rolls, a duster and picker, all of which are adjusted, modified, and adapted to this purpose as well as other purposes.

What I desire to claim as new is—

1. The cleansing of mineral fibers from silex and all other earthy matters, and preparing the same for the uses and purposes as herein set forth.

2. For cleansing and preparing mineral fibers by a chemical process, or by the use of any or all of the machinery or mechanical appliances, as herein set forth.

3. The preparation of fibrous minerals and mineral fibers for the applications and purposes as herein set forth.

4. The preparation of fibrous minerals and mineral fibers for commercial, mechanical, manufacturing, and chemical purposes and uses, prepared chemically or by machinery, in whole or in part, as herein set forth.

5. The preparation of fibrous minerals and mineral fibers for the manufacturing of packing for steam and caloric-engines, pumps, journals and bearings, as hereinbefore set forth, by all or any portion of the machinery or the mechanical appliances.

In testimony whereof I have signed my name to this specification in the presence of two subscribing witnesses.

CHASE A. STEVENS.

Witnesses:
THOMAS E. PACKER,
S. O. DURGIN.